United States Patent
Pontisakos et al.

(10) Patent No.: US 12,434,695 B2
(45) Date of Patent: Oct. 7, 2025

(54) PHANTOM OBJECTS IN SENSOR DATA

(71) Applicant: Ford Global Technologies, LLC, Dearborn, MI (US)

(72) Inventors: Christopher Pontisakos, Allen Park, MI (US); Rajiv Sithiravel, Scarborough (CA); Alex Maurice Miller, Canton, MI (US); Yuhao Liu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 257 days.

(21) Appl. No.: 18/307,870

(22) Filed: Apr. 27, 2023

(65) Prior Publication Data

US 2024/0359685 A1 Oct. 31, 2024

(51) Int. Cl.
*B60W 30/095* (2012.01)
*G01S 13/52* (2006.01)
*G01S 13/931* (2020.01)

(52) U.S. Cl.
CPC .......... *B60W 30/095* (2013.01); *G01S 13/52* (2013.01); *B60W 30/0956* (2013.01); *B60W 2420/408* (2024.01); *B60W 2554/4049* (2020.02); *G01S 13/931* (2013.01)

(58) Field of Classification Search
CPC .............................. G01S 13/52; G01S 13/931
See application file for complete search history.

(56) References Cited

U.S. PATENT DOCUMENTS

| | | |
|---|---|---|
| 11,227,169 B2 | 1/2022 | Bolduc |
| 11,262,442 B2 | 3/2022 | Takada |
| 11,353,578 B2 | 6/2022 | Wang et al. |
| 2009/0079986 A1 | 3/2009 | Haag et al. |
| 2021/0327274 A1 | 10/2021 | Hori et al. |
| 2023/0017983 A1* | 1/2023 | Kunz ............ G01S 13/931 |

FOREIGN PATENT DOCUMENTS

| | | | | |
|---|---|---|---|---|
| JP | 2022133623 A | * | 9/2022 | .......... G01S 13/931 |
| KR | 102327651 B1 | | 11/2021 | |

* cited by examiner

*Primary Examiner* — Christian Chace
*Assistant Examiner* — Shayne M. Gilbertson
(74) *Attorney, Agent, or Firm* — Frank A. MacKenzie; Brooks Kushman P.C.

(57) ABSTRACT

A computer includes a processor and a memory, and the memory stores instructions executable by the processor to receive range data from a ranging sensor of a vehicle, the range data including a stationary object and an apparent moving object; determine that a path of the apparent moving object is within a threshold distance of the stationary object; and upon determining that the path is within the threshold distance of the stationary object, discard the apparent moving object.

19 Claims, 5 Drawing Sheets

PHANTOM OBJECTS IN SENSOR DATA

BACKGROUND

Modern vehicles are typically equipped with radars. A radar transmits radio waves and receives reflections of those radio waves to detect physical objects in the environment. A radar can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves.

DETAILED DESCRIPTION

Figure 1:
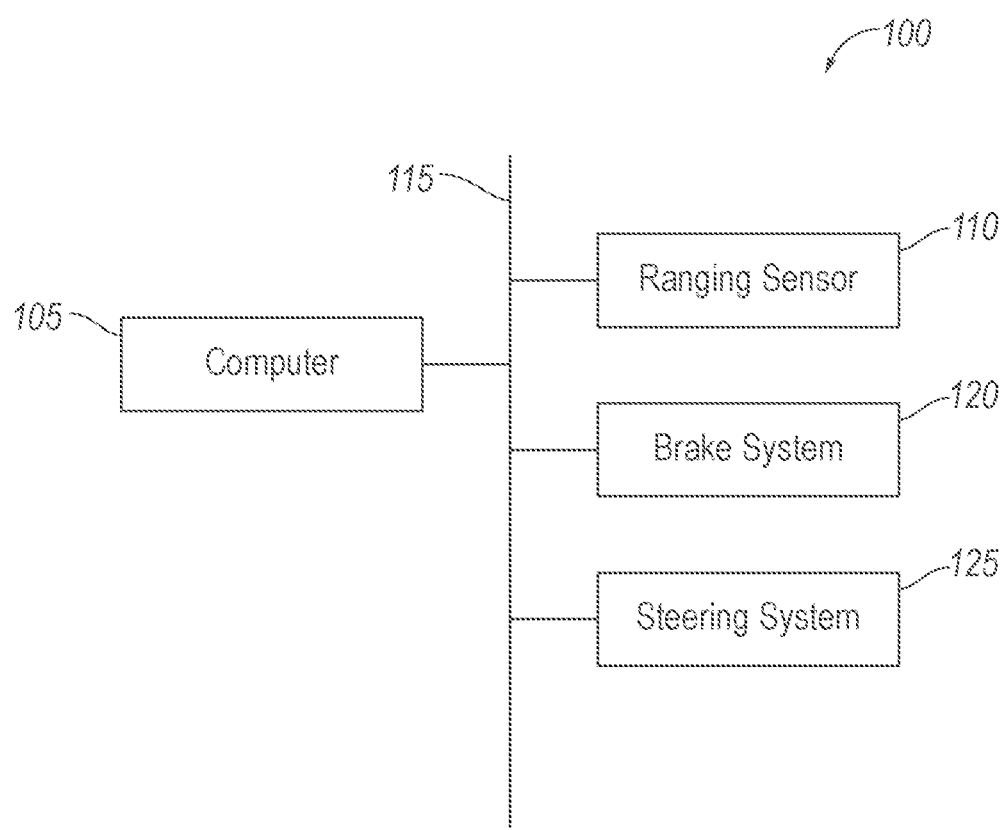
FIG. 1 is a block diagram of an example vehicle.

Radar and other ranging sensors measure distances to objects in the environment by propagating a signal outward to the environment and receiving the signal reflected back. The signals may sometimes indicate "phantom" objects, i.e., objects that are not actually present, as a result of double reflection or other factors. The techniques herein may facilitate identification of some phantom objects from range data, in order to discard the phantom objects. A computer may be programmed to identify a stationary object, identify an apparent moving object from range data, determine that a path of the apparent moving object is within a threshold distance of the stationary object, and upon determining that the path is within the threshold distance of the stationary object (in addition to other criteria), discard the apparent moving object. The apparent moving object passing closer than the threshold distance to the stationary object may indicate that the apparent moving object is a phantom object because a physical object is unlikely to have passed within the threshold distance of the stationary object. The ranging sensor may thereby be made more reliable. The ranging sensor may be mounted to a vehicle, and the computer may actuate the vehicle in response to objects in the environment surrounding the vehicle. By discarding the apparent moving object, the computer may prevent the vehicle from actuating in response to some phantom objects, e.g., braking for a phantom object.

A computer includes a processor and a memory, and the memory stores instructions executable by the processor to receive range data from a ranging sensor of a vehicle, the range data including a stationary object and an apparent moving object; determine that a path of the apparent moving object is within a threshold distance of the stationary object; and upon determining that the path is within the threshold distance of the stationary object, discard the apparent moving object.

In an example, the instructions may further include instructions to, in response to discarding the apparent moving object, refrain from actuating the vehicle based on the apparent moving object.

In an example, the instructions may further include instructions to, upon determining that the path is not within the threshold distance of the stationary object, retain the apparent moving object, and in response to retaining the apparent moving object, actuate the vehicle based on the apparent moving object. In a further example, the instructions to actuate the vehicle may include instructions to actuate at least one of a brake system or a steering system of the vehicle.

In an example, the path may be a projected path, and the instructions may further include instructions to determine the projected path based on a current trajectory of the apparent moving object. In a further example, the projected path may follow a straight line from a current location of the apparent moving object.

In an example, the instructions to determine that the path is within the threshold distance of the stationary object may include instructions to determine that the stationary object is within a rectangle, the rectangle extending by the threshold distance perpendicular to the path.

In an example, the stationary object may be a first stationary object, and the instructions may further include instructions to determine that at least a threshold number of second stationary objects are within a boundary box with the first stationary object, and upon determining both (1) that the path is within the threshold distance of the first stationary object and (2) that at least the threshold number of second stationary objects are within the boundary box with the first stationary object, discard the apparent moving object. In a further example, the boundary box may have a width and a length longer than the width, and the length may be oriented parallel to a forward direction of the vehicle.

In another further example, the threshold distance may be a first threshold distance, the instructions may further include instructions to determine that distances between consecutive ones of the first stationary object and second stationary objects are less than a second threshold distance, and upon determining (1) that the path is within the threshold distance of the stationary object, (2) that at least the threshold number of the second stationary objects are within the boundary box with the first stationary object, and (3) that the distances are less than the second threshold distance, discard the apparent moving object.

In an example, the stationary object may be a first stationary object, the instructions may further include instructions to determine that the path is within the threshold distance of at least a threshold number of stationary objects including the first stationary object, and upon determining that the path is within the threshold distance of at least the threshold number of the stationary objects, discard the apparent moving object. In a further example, the instructions may further include instructions to determine that the path is within the threshold distance of at least the threshold number of the stationary objects within a threshold time, and upon determining that the path is within the threshold distance of at least the threshold number of the stationary objects within the threshold time, discard the apparent moving object.

In an example, the stationary object and the apparent moving object may be on a same lateral side of the vehicle.

In an example, the path being within the threshold distance of the stationary object may be a first criterion, and the instructions may further include instructions to, upon determining that a second criterion is satisfied by the apparent moving object, discard the apparent moving object.

In an example, the apparent moving object may be a first apparent moving object, and the instructions may further include instructions to determine that a difference between a first time for a second apparent moving object to reach the vehicle and a second time for a third apparent moving object to reach the vehicle is less than a time threshold, and upon determining that the difference is less than the time threshold, discard the third apparent moving object. In a further example, the instructions may further include instructions to, upon determining that the difference is greater than the time threshold, retain the second apparent moving object.

In another further example, the second apparent moving object may be moving in a direction parallel to a forward direction of the vehicle.

In another further example, the second apparent moving object and the third apparent moving object are on a same lateral side of the vehicle.

In an example, the ranging sensor may be a radar.

A method includes receiving range data from a ranging sensor of a vehicle, the range data including a stationary object and an apparent moving object; determining that a path of the apparent moving object is within a threshold distance of the stationary object; and upon determining that the path is within the threshold distance of the stationary object, discarding the apparent moving object.

With reference to the Figures, wherein like numerals indicate like parts throughout the several views, a computer 105 includes a processor and a memory, and the memory stores instructions executable by the processor to receive range data from a ranging sensor 110 of a vehicle 100, the range data including a stationary object 205 and an apparent moving object 210; determine that a path 215 of the apparent moving object 210 is within a threshold distance of the stationary object 205, and upon determining that the path 215 is within the threshold distance of the stationary object 205, discard the apparent moving object 210.

With reference to FIG. 1, the vehicle 100 may be any passenger or commercial automobile such as a car, a truck, a sport utility vehicle, a crossover, a van, a minivan, a taxi, a bus, etc.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 115 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to the ranging sensor 110, a brake system 120, a steering system 125, and other components via the communications network 115.

The ranging sensor 110 transmits signals and measures reflections of those signals from the environment. For example, the ranging sensor 110 may be a radar, an ultrasonic sensor, a lidar, etc. A radar transmits radio waves and receives reflections of those radio waves to detect physical objects in the environment. As a radar, the ranging sensor 110 can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves. An ultrasonic sensor measures distances to features of the environment by emitting ultrasonic sound waves and converting the reflected sound into an electrical signal. As an ultrasonic sensor, the ranging sensor 110 may be any suitable type, e.g., a field of view with a comparatively wide horizontal angle and narrow vertical angle. A lidar detects distances to objects by emitting laser pulses at a particular wavelength and measuring the time of flight for the pulse to travel to the object and back. As a lidar, the ranging sensor 110 can be any suitable type for providing the lidar data on which the computer 105 can act, e.g., spindle-type lidar, solid-state lidar, flash lidar, etc.

The brake system 120 is typically a conventional vehicle braking subsystem and resists the motion of the vehicle 100 to thereby slow and/or stop the vehicle 100. The brake system 120 may include friction brakes such as disc brakes, drum brakes, band brakes, etc.; regenerative brakes; any other suitable type of brakes; or a combination. The brake system 120 can include an electronic control unit (ECU) or the like that is in communication with and receives input from the computer 105 and/or a human operator. The human operator may control the brake system 120 via, e.g., a brake pedal.

The steering system 125 is typically a conventional vehicle steering subsystem and controls the turning of the wheels. The steering system 125 may be a rack-and-pinion system with electric power-assisted steering, a steer-by-wire system, as both are known, or any other suitable system. The steering system 125 can include an electronic control unit (ECU) or the like that is in communication with and receives input from the computer 105 and/or a human operator. The human operator may control the steering system 125 via, e.g., a steering wheel.

Figure 2:
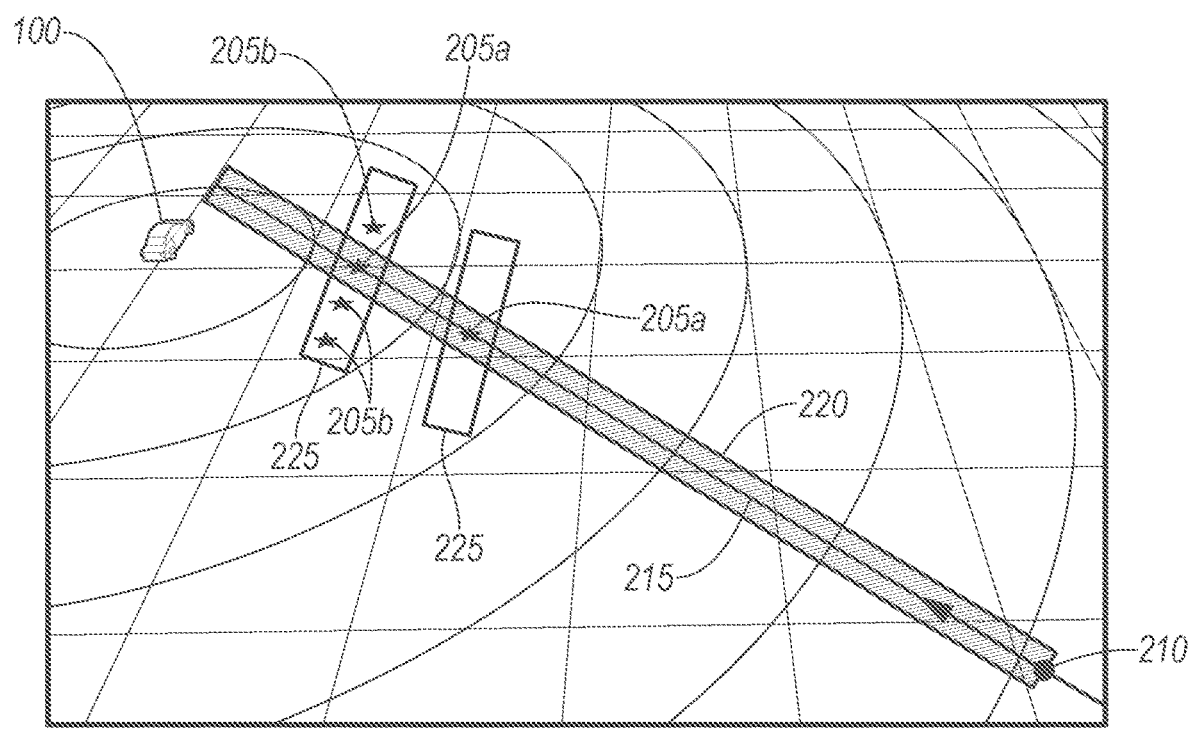
FIG. 2 is a diagram of an example scenario of the vehicle with objects in an environment.

With reference to FIG. 2, the computer 105 is programmed to receive the range data from the ranging sensor 110. The range data may be, e.g., a point cloud. The points of the point cloud specify respective positions in the environment relative to the position of the ranging sensor 110. For example, the range data can be in spherical coordinates with the ranging sensor 110 at the origin of the spherical coordinate system. The spherical coordinates can include a radial distance, i.e., a measured depth from the ranging sensor 110 to the point measured by the ranging sensor 110; a polar angle, i.e., an angle from a vertical axis through the ranging sensor 110 to the point measured by the ranging sensor 110; and an azimuthal angle, i.e., an angle in a horizontal plane from a horizontal axis through the ranging sensor 110 to the point measured by the ranging sensor 110. The horizontal axis can be, e.g., along a vehicle-forward direction. Alternatively, the ranging sensor 110 can return the points as Cartesian coordinates with the ranging sensor 110 at the origin or as coordinates in any other suitable coordinate system, or the computer 105 can convert the spherical coordinates to Cartesian coordinates or another coordinate system after receiving the range data.

The range data includes at least one stationary object 205. The computer 105 may be programmed to identify the stationary object 205 in the range data. Objects may correspond to a single point in the point cloud or to multiple points clustered together that move (if at all) in unison, e.g., according to known clustering algorithms. The computer 105 may identify an object as a stationary object 205 by determining that the position of the object does not change for at least a threshold period of time. Alternatively or additionally, the computer 105 may identify an object as a stationary object 205 by determining that map data indicates that a type of object known to be stationary is at a position matching the position of the object in the range data.

The range data includes at least one apparent moving object 210. The computer 105 may be programmed to identify the apparent moving object 210. The computer 105 may identify an object as a moving object by tracking a change in position of the object over time. The computer 105 may determine a current trajectory of the moving object. For example, the current trajectory may be a velocity vector of the moving object, e.g., with a direction pointing from a first position of the object to a second position of the object and a magnitude equal to a distance between the first position and the second position divided by a time between the object being at the first position and the second position.

The computer 105 is programmed to determine whether the apparent moving object 210 is an actual moving object or a phantom object. The computer 105 may determine whether the apparent moving object 210 satisfies at least one criterion from a plurality of criteria, each criterion indicating that the apparent moving object 210 is a phantom object. The different criteria are described in depth below.

The computer 105 is programmed to retain or discard the apparent moving object 210 depending on whether the apparent moving object 210 is determined to be an actual moving object or a phantom object, i.e., depending on whether at least one of the criteria is satisfied. The computer 105 is programmed to, upon determining that the apparent moving object 210 satisfies none of the criteria, retain the apparent moving object 210. The computer 105 is programmed to, upon determining that the apparent moving object 210 satisfies at least one of the criteria, discard the apparent moving object 210. The computer 105 may discard the apparent moving object 210 by deleting the apparent moving object 210 from the memory of the computer 105 and/or by setting a flag in memory indicating not to use the apparent moving object 210.

The computer 105 is programmed to, in response to discarding the apparent moving object 210, refrain from actuating the vehicle 100 based on the apparent moving object 210, and to, in response to retaining the apparent moving object 210, actuate the vehicle 100 based on the apparent moving object 210. The computer 105 may actuate the vehicle 100 by actuating at least one of the brake system 120 or the steering system 125, e.g., according to an advanced driver assistance system (ADAS). ADAS are electronic technologies that assist drivers in driving and parking functions. ADAS may have conditions for specific actuations of the vehicle 100. For example, the computer 105 may actuate the brake system 120 to attempt to stop the vehicle 100 before intersecting the retained apparent moving object 210 in response to the retained apparent moving object 210 being within a threshold distance in front of the vehicle 100, e.g., according to an automated emergency braking algorithm, as is known. For another example, the computer 105 may actuate the brake system 120 to attempt to turn the vehicle 100 before intersecting the retained apparent moving object 210 in response to the retained apparent moving object 210 being within a threshold zone relative to the vehicle 100, e.g., according to an evasive steering assistance algorithm, as is known. Refraining from actuating the vehicle 100 for the discarded apparent moving object 210 includes not actuating, e.g., the brake system 120 or the steering system 125, in situations in which the brake system 120 or steering system 125 would have actuated if the apparent moving object 210 had been retained, e.g., in situations in which the discarded apparent moving objects 210 would have satisfied the ADAS conditions.

The criteria for discarding the apparent moving object 210 will now be described.

A first criterion may include that a path 215 of the apparent moving object 210 is within a first threshold distance of the stationary object 205. For example, the first criterion may be that the first two or all three of the following conditions are satisfied: (1) The path 215 is within the first threshold distance of a first stationary object 205*a*, (2) at least a threshold number of second stationary objects 205*b* are within a boundary box 225 with the first stationary object 205*a*, and (3) that distances between consecutive ones of the stationary objects 205 within the boundary box 225 are less than a second threshold distance. The first criterion may detect when the apparent moving object 210 would pass through a guardrail, fence, set of bollards, or other barrier, which may be physically impossible, indicating that the apparent moving object 210 is a phantom object.

As part of assessing the first criterion, the computer 105 may be programmed to determine the path 215 of the apparent moving object 210. The path 215 may be a projected path. The computer 105 may determine the path 215 based on the current trajectory of the apparent moving object 210, e.g., by predicting that the apparent moving object 210 will continue moving with the same velocity vector. The projected path 215 may thus follow a straight line from a current location of the apparent moving object 210 in the current direction of travel of the apparent moving object 210.

As part of assessing the first criterion, the computer 105 is programmed to determine whether the path 215 of the apparent moving object 210 is within the first threshold distance of the first stationary object 205*a*. The first stationary object 205*a* is the stationary object 205 closest to the path 215. The first threshold distance may be chosen to be smaller than an object could comfortably pass by another object. For example, the computer 105 may define a rectangle 220 elongated along the path 215, centered on the path 215, and extending perpendicular to the path 215 on both sides by the first threshold distance (i.e., has a width of twice the first threshold distance that is centered on the path 215). The computer 105 may then determine whether at least one stationary object 205 is positioned inside the rectangle 220. If so, the at least one stationary object 205 is treated as the first stationary object 205*a*, and this condition of the first criterion is satisfied.

This determination may be limited to considering the stationary objects 205 on a same lateral side of the vehicle 100 as the apparent moving object 210 (the right side of the vehicle 100 as shown in FIG. 2). The computer 105 may determine that an object is on a particular lateral side of the vehicle 100 by projecting a longitudinal midline of the vehicle 100 forward and rearward from the vehicle 100 and identifying whether the object is to the right or to the left of the longitudinal midline. If the apparent moving object 210 would pass within the first threshold distance of a stationary object 205 after crossing from the right side of the vehicle 100 to the left side (or vice versa), i.e., after the rectangle 220 crosses the longitudinal midline from the apparent moving object 210 before encompassing the stationary object 205, then this condition of the first criterion is not satisfied.

As part of assessing the first criterion, the computer 105 may determine whether at least a threshold number of second stationary objects 205b are within the boundary box 225 with the first stationary object 205a. The boundary box 225 has a width and a length longer than the width, i.e., the length is the longer dimension and the width is the shorter dimension, and the length may be oriented parallel to a forward direction of the vehicle 100. For example, the boundary box 225 may have a length at least twice as long as the width, e.g., a length of 5 meters and a width of 1 meter. The boundary box 225 may be positioned so as to maximize a number of stationary objects 205 encompassed by the boundary box 225, e.g., by translating the boundary box 225 along its length. The threshold number may be chosen to indicate a barrier, e.g., a typical minimum number of posts for a barrier. If at least the threshold number of stationary objects 205 are within the boundary box 225, then this condition of the first criterion is satisfied.

As part of assessing the first criterion, the computer 105 may determine whether distances between consecutive ones of the first stationary object 205a and second stationary objects 205b within the boundary box 225 are less than the second threshold distance. The second threshold distance may be chosen based on a typical distance between consecutive posts of a barrier. The computer 105 may determine a distance between a closest and a second closest of the stationary objects 205 in the boundary box 225 along the forward direction of travel of the vehicle 100, a distance between the second closest and a third closest of the stationary objects 205 in the boundary box 225 along the forward direction of travel of the vehicle 100, and so on to the farthest of the stationary objects 205 in the boundary box 225 along the forward direction of travel of the vehicle 100. The computer 105 may compare the distances to the second threshold distance. If all the distances are shorter than the second threshold distance, then this condition of the first criterion is satisfied.

Figure 3:
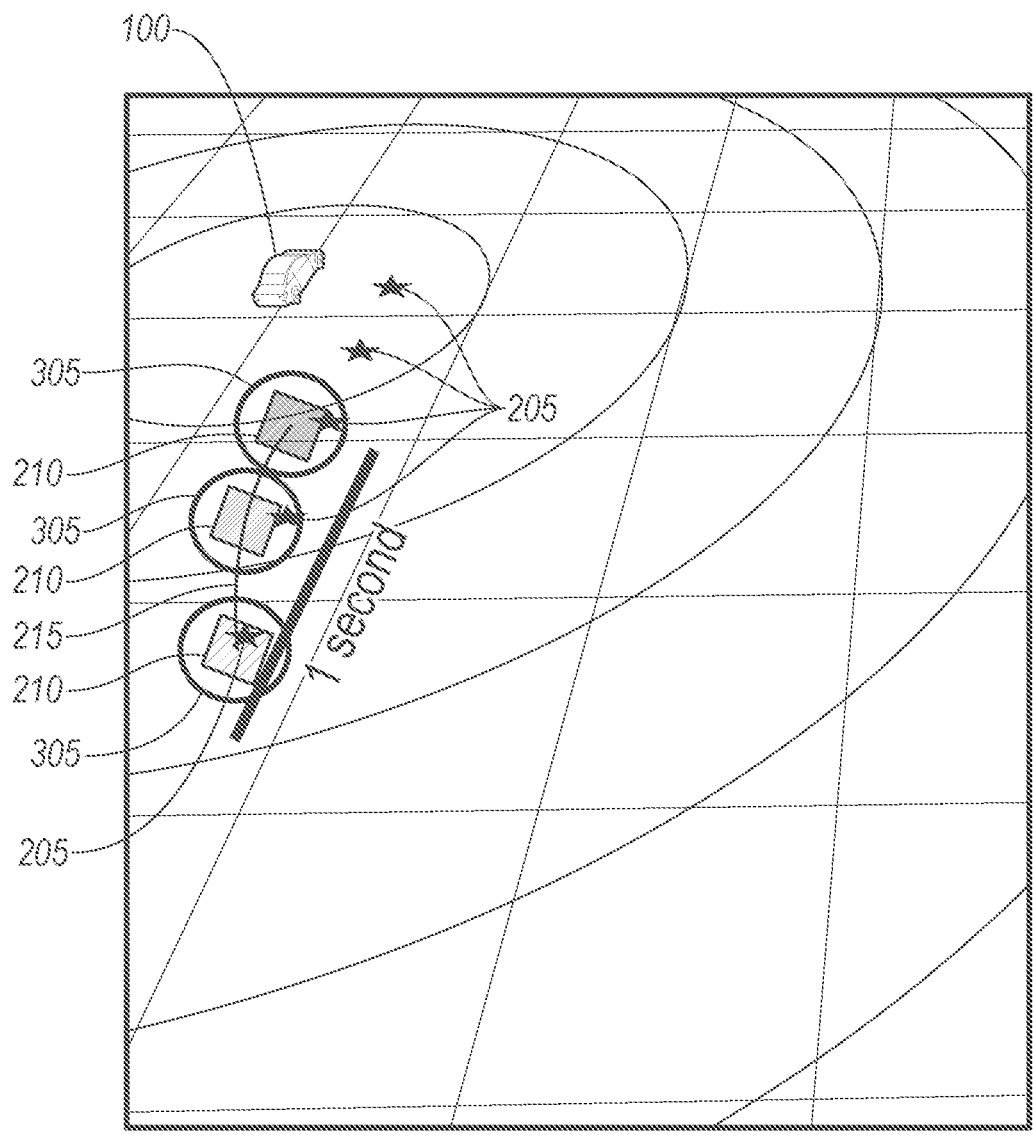
FIG. 3 is a diagram of another example scenario of the vehicle with the objects in the environment.

With reference to FIG. 3, a second criterion may include that the path 215 of the apparent moving object 210 is within a threshold distance of the stationary object 205. For example, the second criterion may be that the path 215 is within the threshold distance of at least a threshold number of the stationary objects 205, e.g., within a threshold time.

As part of assessing the second criterion, the computer 105 may be programmed to determine whether the path 215 of the apparent moving object 210 is within the threshold distance of at least the threshold number of stationary objects 205. The path 215 may be a past path, i.e., along which the apparent moving object 210 has already traveled. The threshold distance may be chosen to be smaller than an object could comfortably pass by another object. The threshold number of stationary objects 205 may be chosen to reduce the likelihood of a false negative. The computer 105 may determine whether the apparent moving object 210 passes within the threshold distance of each stationary object 205 at some point along the path 215. The threshold distance is represented in FIG. 3 by a circle 305 around the apparent moving object 210. FIG. 3 depicts the apparent moving object 210 at three consecutive times. If the apparent moving object 210 passes within the threshold distance of a stationary object 205 for at least the threshold number of times, then this condition of the second criterion is satisfied.

As part of assessing the second criterion, the computer 105 may be programmed to determine whether the path 215 is within the threshold distance of at least the threshold number of the stationary objects 205 within the threshold time. The threshold time may be chosen to be long enough for multiple stationary objects 205 to be traversed and short enough for continually assessment of the second criterion, e.g., 1 second. For example, the computer 105 may store instances of the apparent moving object 210 passing within the threshold distance of a stationary object 205 in memory for the threshold time, and count the number of instances stored in memory at one time. If at least the threshold number of instances is stored in memory, then this condition of the second criterion is satisfied.

Figure 4:
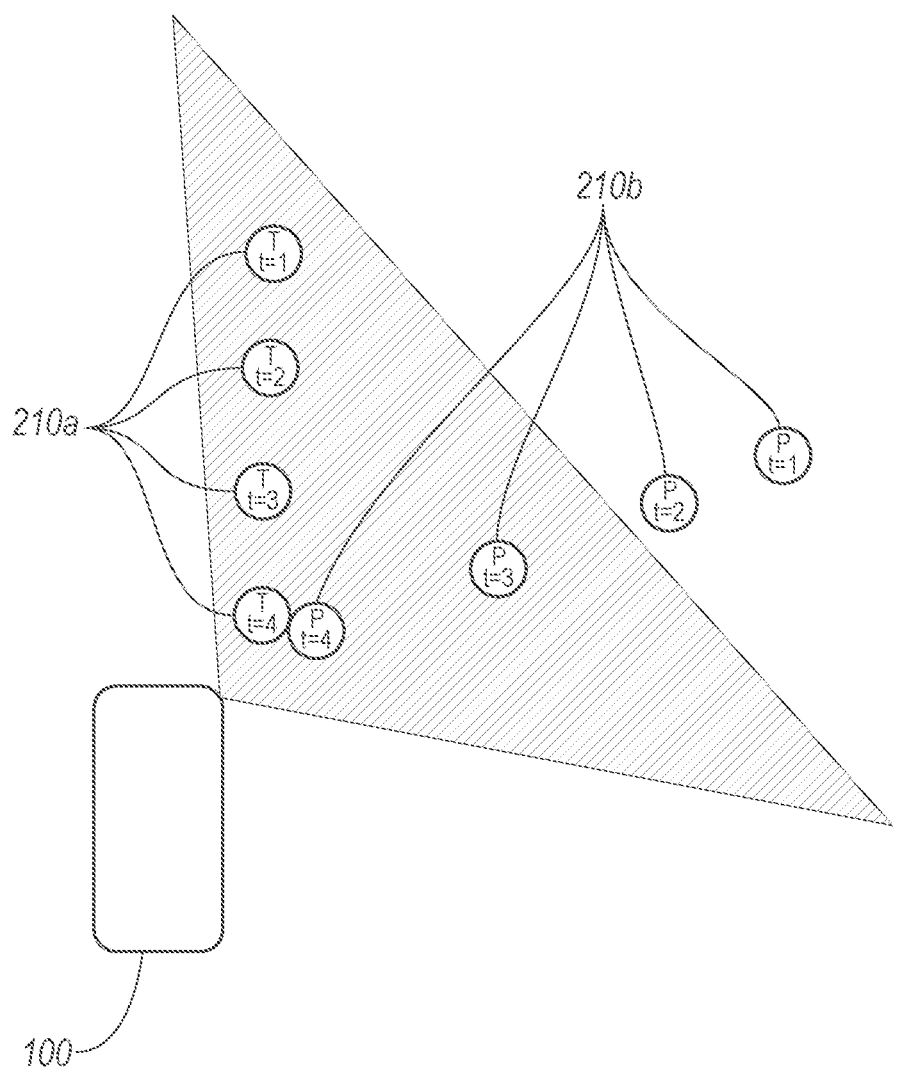
FIG. 4 is a diagram of another example scenario of the vehicle with the objects in the environment.

With reference to FIG. 4, a third criterion includes that a difference between a first time for a first apparent moving object 210a to reach the vehicle 100 and a second time for a second apparent moving object 210b to reach the vehicle 100 is less than a time threshold. FIG. 4 shows the first apparent moving object 210a and second apparent moving object 210b at four consecutive times. The computer 105 may be programmed to, upon determining that the difference is less than the time threshold, discard the second apparent moving object 210b but retain the first apparent moving object 210a.

As part of assessing the third criterion, the computer 105 may be programmed to identify the first apparent moving object 210a and the second apparent moving object 210b for assessment. The computer 105 may identify the first apparent moving object 210a and the second apparent moving object 210b such that the first apparent moving object 210a and the second apparent moving object 210b are on a same lateral side of the vehicle 100, e.g., both on the right side or both on the left side. The computer 105 may identify the first apparent moving object 210a, i.e., the apparent moving object 210 that will be retained, by identifying an apparent moving object 210 that is moving in a direction parallel to the forward direction of the vehicle 100. The computer 105 may determine the current trajectory of the apparent moving object 210 and determine either that the current trajectory is in the same direction or the opposite direction as the forward direction of the vehicle 100, in which case the apparent moving object 210 is traveling parallel to the forward direction, or that the current trajectory is oblique to the forward direction of the vehicle 100.

As part of assessing the third criterion, the computer 105 may be programmed to determine the first time and the second time. The first time is a time for the first apparent moving object 210a to reach the vehicle 100. The first time may be a time for the first apparent moving object 210a to reach a same longitudinal position as the vehicle 100 relative to the vehicle 100, i.e., a position laterally offset from and longitudinally equal to the vehicle 100 (since the first apparent moving object 210a is moving parallel to the vehicle 100). The computer 105 may solve an equation for a time, the equation setting a longitudinal position of the vehicle 100 as a function of the time and the current speed of the vehicle 100 equal to a longitudinal position of the first apparent moving object 210a as a function of the time and the current speed of the first apparent moving object 210a. The second time is a time for the second apparent moving object 210b to reach the vehicle 100. The second time may be a time for the second apparent moving object 210b to reach a same longitudinal position as the vehicle 100 relative to the vehicle 100, as just described for the first apparent moving object 210a, or the second time may be a time for the second apparent moving object 210b to reach a same longitudinal and lateral position as the vehicle 100. The computer 105 may solve a system of equations for a time, the system of equations setting a two-dimensional position of the vehicle 100 as a function of the time and the current velocity vector of the vehicle 100 equal to a two-dimensional position of the second apparent moving object 210b as a function of the time and the current velocity vector of the second apparent moving object 210b.

As part of assessing the third criterion, the computer 105 may be programmed to determine the difference between the first time and the second time, e.g., by calculating the absolute value of the first time minus the second time. The computer 105 may determine whether the difference is greater than the time threshold. The time threshold may be chosen to reflect a measurement error of the first time equaling the second time. If the difference is less than the time threshold, then the third criterion is satisfied.

The criteria for the apparent moving object 210 may include other criteria than just described. For example, a criterion may include that the apparent moving object 210 has a size below a threshold size, e.g., a threshold width and/or height. The threshold size may be chosen to be typical of reflected radar returns and to be significantly smaller than other road users. For another example, a criterion may include that the apparent moving object 210 maintains a same relative position to the vehicle 100 as the vehicle 100 stops and moves forward. The relative position may be limited to particular zones relative to the vehicle 100, e.g., in which reflected radar returns are more likely.

Figure 5:
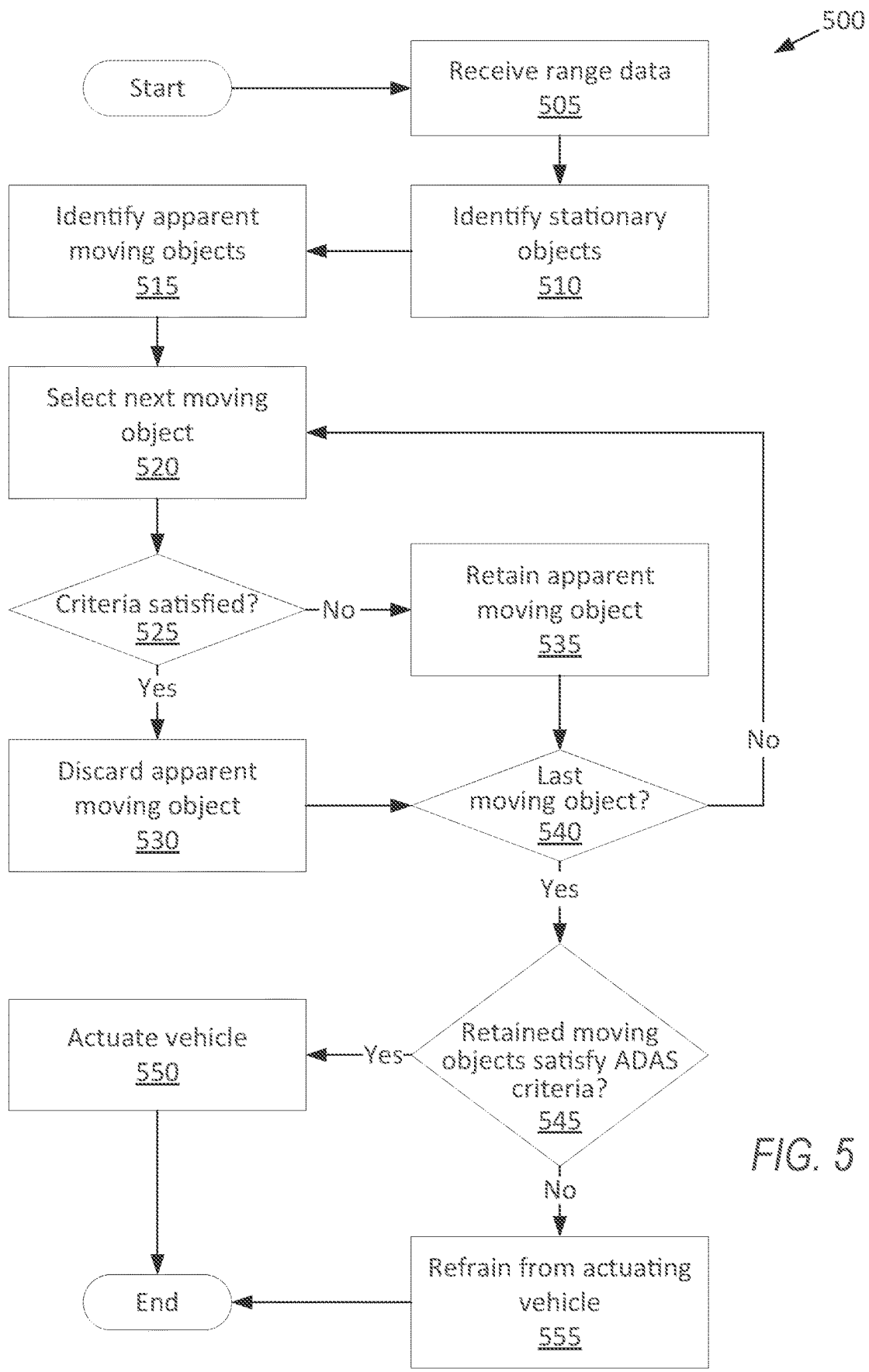
FIG. 5 is a flowchart of an example process for actuating the vehicle based on the objects.

FIG. 5 is a flowchart illustrating an example process 500 for assessing apparent moving objects 210. The memory of the computer 105 stores executable instructions for performing the steps of the process 500 and/or programming can be implemented in structures such as mentioned above. As a general overview of the process 500, the computer 105 receives range data, identifies stationary objects 205, identifies apparent moving objects 210. For each apparent moving object 210, the computer 105 discards the apparent moving object 210 upon determining that at least one of the criteria is satisfied and retains the apparent moving object 210 upon determining that none of the criteria are satisfied. In response to a retained apparent moving object 210 satisfying ADAS conditions for actuating the vehicle 100, the computer 105 actuates the vehicle 100. The computer 105 refrains from actuating the vehicle 100 for discarded apparent moving objects 210 and for retained apparent moving objects 210 not satisfying the ADAS conditions.

The process 500 begins in a block 505, in which the computer 105 receives the range data from the ranging sensor 110, as described above.

Next, in a block 510, the computer 105 identifies any stationary objects 205, as described above.

Next, in a block 515, the computer 105 identifies any apparent moving objects 210 from the range data, as described above.

Next, in a block 520, the computer 105 selects a next apparent moving object 210. For example, the computer 105 may store the apparent moving objects 210 identified in the block 515 in a list and proceed to the next apparent moving object 210 in the order of the list, starting with the first. The apparent moving objects 210 may be ordered, e.g., according to distance from the vehicle 100.

Next, in a decision block 525, the computer 105 determines whether any of the criteria for discarding the selected apparent moving object 210 are satisfied, as described above. Upon determining that the selected apparent moving object 210 satisfies at least one criterion, the process 500 proceeds to a block 530. Upon determining that the selected apparent moving object 210 does not satisfy any criteria, the process 500 proceeds to a block 535.

In the block 530, the computer 105 discards the selected apparent moving object 210, as described above. After the block 530, the process 500 proceeds to a decision block 540.

In the block 535, the computer 105 retains the selected apparent moving object 210, as described above. After the block 535, the process 500 proceeds to the decision block 540.

In the decision block 540, the computer 105 determines whether the selected apparent moving object 210 is the last apparent moving object 210 identified in the block 515. For example, the computer 105 may determine whether the selected apparent moving object 210 is the last apparent moving object 210 stored in the list in memory. If the selected apparent moving object 210 is not the last apparent moving object 210, the process 500 returns to the block 520 to proceed to the next apparent moving object 210. If the apparent selected moving object is the last apparent moving object 210, the process 500 proceeds to a decision block 545.

In the decision block 545, the computer 105 determines whether any of the retained apparent moving objects 210 satisfy any of the ADAS conditions, as described above. If so, the process 500 proceeds to a block 550. If not, the process 500 proceeds to a block 555.

In the block 550, the computer 105 actuates the vehicle 100 based on the retained apparent moving object 210 that satisfied the ADAS conditions, as described above, e.g., by actuating the brake system 120 or the steering system 125. The computer 105 refrains from actuating the vehicle 100 based on the discarded apparent moving objects 210, and the computer 105 refrains from actuating the vehicle 100 based on the retained apparent moving objects 210 that do not satisfy the ADAS conditions. After the block 550, the process 500 ends.

In the block 555, the computer 105 refrains from actuating the vehicle 100 based on the discarded apparent moving objects 210, and the computer 105 refrains from actuating the vehicle 100 based on the retained apparent moving objects 210, all of which do not satisfy the ADAS conditions. After the block 555, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   receive range data from a ranging sensor of a vehicle, the range data including a stationary object and a first apparent moving object;
   determine that a path of the first apparent moving object is within a threshold distance of the stationary object;
   upon determining that the path is within the threshold distance of the stationary object, discard the first apparent moving object;
   determine that a difference between a first time for a second apparent moving object to reach the vehicle and a second time for a third apparent moving object to reach the vehicle is less than a time threshold;
   upon determining that the difference is less than the time threshold, discard the third apparent moving object; and
   in response to discarding the first apparent moving object, refrain from actuating the vehicle based on the first apparent moving object.

2. The computer of claim 1, wherein the instructions further include instructions to, upon determining that the path is not within the threshold distance of the stationary object, retain the first apparent moving object, and in response to retaining the first apparent moving object, actuate the vehicle based on the first apparent moving object.

3. The computer of claim 2, wherein the instructions to actuate the vehicle include instructions to actuate at least one of a brake system or a steering system of the vehicle.

4. The computer of claim 1, wherein the path is a projected path, and the instructions further include instructions to determine the projected path based on a current trajectory of the first apparent moving object.

5. The computer of claim 4, wherein the projected path follows a straight line from a current location of the first apparent moving object.

6. The computer of claim 1, wherein the instructions to determine that the path is within the threshold distance of the stationary object include instructions to determine that the stationary object is within a rectangle, the rectangle extending by the threshold distance perpendicular to the path.

7. The computer of claim 1, wherein the stationary object is a first stationary object, and the instructions further include instructions to determine that at least a threshold number of second stationary objects are within a boundary box with the first stationary object, and upon determining both (1) that the path is within the threshold distance of the first stationary object and (2) that at least the threshold number of second stationary objects are within the boundary box with the first stationary object, discard the first apparent moving object.

8. The computer of claim 7, wherein the boundary box has a width and a length longer than the width, and the length is oriented parallel to a forward direction of the vehicle.

9. The computer of claim 7, wherein the threshold distance is a first threshold distance, and the instructions further include instructions to determine that distances between consecutive ones of the first stationary object and second stationary objects are less than a second threshold distance, and upon determining (1) that the path is within the threshold distance of the stationary object, (2) that at least the threshold number of the second stationary objects are within the boundary box with the first stationary object, and (3) that the distances are less than the second threshold distance, discard the first apparent moving object.

10. The computer of claim 1, wherein the stationary object is a first stationary object, the instructions further include instructions to determine that the path is within the threshold distance of at least a threshold number of stationary objects including the first stationary object, and upon determining that the path is within the threshold distance of at least the threshold number of the stationary objects, discard the first apparent moving object.

11. The computer of claim 10, wherein the instructions further include instructions to determine that the path is within the threshold distance of at least the threshold number of the stationary objects within a threshold time, and upon determining that the path is within the threshold distance of at least the threshold number of the stationary objects within the threshold time, discard the first apparent moving object.

12. The computer of claim 1, wherein the stationary object and the first apparent moving object are on a same lateral side of the vehicle.

13. The computer of claim 1, wherein the path being within the threshold distance of the stationary object is a first criterion, and the instructions further include instructions to, upon determining that a second criterion is satisfied by the first apparent moving object, discard the first apparent moving object.

14. The computer of claim 1, wherein the instructions further include instructions to, upon determining that the difference is greater than the time threshold, retain the second apparent moving object.

15. The computer of claim 1, wherein the second apparent moving object is moving in a direction parallel to a forward direction of the vehicle.

16. The computer of claim 1, wherein the second apparent moving object and the third apparent moving object are on a same lateral side of the vehicle.

17. The computer of claim 1, wherein the ranging sensor is a radar.

18. A method comprising:
receiving range data from a ranging sensor of a vehicle, the range data including a stationary object and a first apparent moving object;
determining that a path of the first apparent moving object is within a threshold distance of the stationary object;
upon determining that the path is within the threshold distance of the stationary object, discarding the first apparent moving object;
determining that a difference between a first time for a second apparent moving object to reach the vehicle and a second time for a third apparent moving object to reach the vehicle is less than a time threshold;
upon determining that the difference is less than the time threshold, discarding the third apparent moving object; and
in response to discarding the first apparent moving object, refraining from actuating the vehicle based on the first apparent moving object.

19. A computer comprising a processor and a memory, the memory storing instructions executable by the processor to:
receive range data from a ranging sensor of a vehicle, the range data including a first stationary object and an apparent moving object;
determine that a path of the apparent moving object is within a threshold distance of the first stationary object;
upon determining that the path is within the threshold distance of the first stationary object, discard the apparent moving object;
determine that at least a threshold number of second stationary objects are within a boundary box with the first stationary object;
upon determining both (1) that the path is within the threshold distance of the first stationary object and (2) that at least the threshold number of second stationary objects are within the boundary box with the first stationary object, discard the apparent moving object; and
in response to discarding the apparent moving object, refrain from actuating the vehicle based on the apparent moving object.

* * * * *